Jan. 12, 1971  C. A. PAZAR ET AL  3,555,144
COLOR-CODED JIGSAW DESIGN TABLET COMPRESSED FROM THERAPEUTIC
EXTRUDED CYLINDRICAL GRANULES OF VISIBLY DIFFERENT COLORS
Original Filed March 2, 1965  4 Sheets-Sheet 1

FIG. 1

INVENTORS
CHARLES ARNOLD PAZAR
JAMES HENRY WILEY
BY

ATTORNEY

Jan. 12, 1971 C. A. PAZAR ET AL 3,555,144
COLOR-CODED JIGSAW DESIGN TABLET COMPRESSED FROM THERAPEUTIC
EXTRUDED CYLINDRICAL GRANULES OF VISIBLY DIFFERENT COLORS
Original Filed March 2, 1965 4 Sheets-Sheet 2

INVENTORS
CHARLES ARNOLD PAZAR
JAMES HENRY WILEY
BY
Samuel Branch Walker
ATTORNEY Jan. 12, 1971 C. A. PAZAR ET AL 3,555,144
COLOR-CODED JIGSAW DESIGN TABLET COMPRESSED FROM THERAPEUTIC
EXTRUDED CYLINDRICAL GRANULES OF VISIBLY DIFFERENT COLORS
Original Filed March 2, 1965 4 Sheets-Sheet 3

INVENTORS
CHARLES ARNOLD PAZAR
JAMES HENRY WILEY
BY
Samuel Branch Walker
ATTORNEY

United States Patent Office

3,555,144
Patented Jan. 12, 1971

3,555,144
COLOR-CODED JIGSAW DESIGN TABLET COMPRESSED FROM THERAPEUTIC EXTRUDED CYLINDRICAL GRANULES OF VISIBLY DIFFERENT COLORS
Charles Arnold Pazar, Glen Rock, and James Henry Wiley, Westwood, N.J., assignors to American Cyanamid Company, Stamford, Conn., a corporation of Maine
Continuation of application Ser. No. 436,631, Mar. 2, 1965, which is a continuation-in-part of application Ser. No. 98,407, Mar. 27, 1961, now Patent No. 3,177,820, which in turn is a continuation-in-part of application Ser. No. 22,876, Apr. 18, 1960. This application May 29, 1969, Ser. No. 853,996
Int. Cl. A61k 9/00; B29c 9/00
U.S. Cl. 424—2                                         1 Claim

ABSTRACT OF THE DISCLOSURE

Therapeutic tablets of improved uniformity of composition, absorbability, size and appearance; increased strength and greater density, as well as elegant appearance; and multicolored surface and cross-section for counterfeit detection and a product identification are obtained by compression into tablets of a dried plasticized extruded mixture. The medicament, a binder, and a liquid, often water, are compacted, homogenized, and extruded through a high pressure screw extruder as small strands, which are dried, and before or after drying segmented into granules, with the drying giving a surface hardness to the granules. On lubrication and compaction, a denser more uniform tablet is produced, with reduction or elimination of capping and laminating, as compared with conventional procedures.

RELATED APPLICATIONS

This is a streamlined continuation of Ser. No. 436,631, filed Mar. 2, 1965, now abandoned, which was a continuation-in-part of application Ser. No. 98,407, filed Mar. 27, 1961, now U.S. Pat. No. 3,177,820, dated Apr. 13, 1965 entitled Tablet Granulation Apparatus, which is a continuation-in-part of application Ser. No. 22,876, filed Apr. 18, 1960, entitled Method of Preparing Tablet Granulations, now abandoned.

This invention relates to an improvement in a method of preparing pharmaceutical tablet granulations, and tablets obtained therefrom, with particular reference to an auger screw granulation method.

Very few crystalline or powdered materials used as pharmaceutical agents can be compressed into suitable tablets on automatic tabletting equipment in their crystalline or powdered form.

Some such powders are not self-adherent under reasonable pressures, and some do not uniformly compact, so that any tablets produced would have erratic weights.

The practice has developed of first preparing a granulation of the material with a grain-like structure suitable for compression into tablets. There are two well-known general methods of preparing such a granulation, namely the dry granulating process (which is also known as "slugging") and the wet granulating process.

The dry granulating process consists of compressing the dried powder into oversized tablets or "slugs." These oversized tablets or "slugs" are then broken into granules of varying sizes with concurrent production of "fines," that is undersirable undersize material.

Many pharmaceutical materials cannot be formed into granules by dry granulation methods. In addition, in some cases, granules formed by dry granulation cannot be compressed to form tablets. Accordingly, a more frequently used method for granulating a wide variety of pharmaceutical materials is the wet granulating process.

The wet granulating process consists of moistening a dry powder, with or without the addition of an adhesive substance, until the whole is converted into a porous, crumbly mass. The crumbly mass is then forced through a screen in order to form discrete particles. After drying, these particles are further reduced in size by comminuting and screening. This results in the production of a large percentage of granules of a desired size but, unfortunately, it also results in the production of an appreciable quantity of undersize particles, called "fines." The most commonly used moistening agent is water, although other solvents are well known for this purpose. It is also common practice to add a substance such as gelatin, starch or gum acacia as binder, in order to assist in granulating the material, and/or improve the tabletting characteristics of the product. The dispersion of the binder in the mass is critical to the quality of both the granulation and the tablets produced therefrom. It is now known that a lack of homogeneity in the granulation, such as is obtained by conventional granulation processes, in part results in the release of uncoated particles as fines or "dust," which is incapable of adhesion on compaction and which has contributed significantly to the problems of tabletting.

With regard to the wet granulating process, there are two principal techniques: (1) forming of granules without pressure by tumbling wetted masses in suitable containers prior to screening; and (2) forming of granules with low or no pressrue by mixing powders and liquids with the aid of stirring devices prior to screening.

In the first, it has proved extremely difficult to granulate certain pharmaceutical materials in sizes coarser than 100 mesh, a size much too fine for tabletting. Alternatively, in other instances, some pharmaceutical materials overgranulate, forming large balls of uncontrollable size which require re-working before becoming utilizable for satisfactory tabletting.

The second method is currently in use by the majority of pharmaceutical manufacturers. It requires a battery of relatively expensive devices arranged in sequence so as to handle the necessary operations one at a time in batch fashion; and a considerable amount of hand labor in the actual transfer of material from one piece of apparatus to another, which adds to time and cost. Moreover, the 10% to 20% of fine particles resulting from this technique tends to cause binding in the die, and "capping" and "lamination."

Thus, neither of the two above-cited wet granulating techniques is entirely satisfactory. Also, complete reproducibility from batch to batch cannot be obtained, due to difficulty in controlling the variables involved in granule formation.

The present invention is based upon the discovery that a plasticized mass containing one or more therapeutic materials may be readily converted into an excellent granulation by extruding a blended and moistened mixture of ingredients under high pressure through a die having a plurality of orifices of critical dimensions so as to produce strands or strings or ribbons of the plasticized mass, of round, elliptical, rectangular, triangular or other cross-section, and then case hardening and drying these strands. The strands may be cut or broken before or after drying, or both, to form rods, not necessarily of circular cross-section. A minimum of hand labor and reworking is required.

The compression involved in extrusion increases the density of the granulation and the resulting granules are of greater density, and hence stronger.

The amount of dust produced in comminution of the granules is markedly decreased. Hence, less lubricant is required on the tablet-forming dies, the tablets produced are brighter and shinier, different colors of granules produce tablets with sharper lines of demarkation, and wear on the tablet-forming punches and dies is reduced. The more consistent nature of the granules permits closer tolerances in tablet weight. Various shaped tablets are more readily produced, for example triangular shaped tablets. If the cross-section of the granules is triangular for some, and of different colors, very pretty tablets are produced. While ornamental to behold, the varied colors both have trade-identification characteristics and aid in detection of counterfeiting or substitution.

Because the granules are more dense, from the extrusion pressure, more pressure may be used in tabletting, and denser tablets produced. This slows the rate of release, so delayed-release products are obtained. The surface of the granules may be sprayed with slowly soluble gums, natural or synthetic, to delay release further. A water-soluble starch may be incorporated in tabletting to give an increased rate of action of the tablets. Hence, the manufacturer has greater control over the characteristics of the tablets as regards solution rates on ingestion by the user. The pressure used in tabletting also affects the rate of solution.

In large scale production, as a matter of choice and convenience, the extrusion is from a screw auger type continuous extruder as is described in detail below as a preferred embodiment, particularly for large scale production. For smaller batches, the mixing of the granulation mass may be in a power or hand mixer of suitable size, and extrusion may be through orifices at the end of a cylinder, with manual filling of the cylinder and a hydraulic, mechanical or hand operated piston used for extrusion. For small scale operations a hand operated potato dicer gives good results. One such device is a cylinder about 3 inches in diameter and 3 inches long, with a perforated wall and bottom, and piston operated by hand, using a lever for mechanical advantage, with the perforation of appropriate size.

The throughput of a screw extruder is greatly increased by chilling the outer sleeve of the extruder, so that the viscosity is much greater near the auger sleeve, with a consequent increase in extrusion efficiency.

In the present invention, the outer layer of the viscous liquid, or viscous material, in the extruder is chilled and thereby has markedly higher viscosity, and as such the theoretical concepts based upon uniform viscosity no longer hold, and an extrusion rate increase of several-fold can be obtained. As contrasted with a conventional extrusion system in which the screw and the jacket are held at a comparatively constant temperature, an extrusion system can be used which, under constant temperature conditions will have practically no output at all, and yet by chilling the jacket the output is increased to three or four times or more the constant temperature output, and the output of the auger screw approaches the theoretical output in which the auger screw is considered as having the type of volume relationship that would be expected for a screw operating with unrestricted discharge, as for example, the thread volume of a screw in wood, or other solid material. This can be referred to as the volumetric capacity of the auger screw. Many extruders have been used in which the auger sleeve has been jacketed or the auger screw itself has had temperature control passages in order that the working energy of extrusion, a large part of which is converted to heat, could be removed to prevent overheating the extruded material. The present concepts revolve around the treatment of an extrusion concept in which the extruded material is chilled at the periphery in contact with the auger sleeve, and by thus maintaining a completely non-uniform viscosity an entirely different set of extrusion concepts are brought into play. The present extruder gives excellent results with fluids which are Newtonian, non-Newtonian, thixotropic, and pseudo-plastic. Surprisingly high extrusion rates are obtained even though the clearance between the auger screw and the auger sleeve is greater than the diameter of the extrusion orifices which would, at first impression, lead a casual observer to think that the slippage of the auger screw in the auger sleeve would be so excessive that no successful extrusion would be obtained.

Certain modifications of an apparatus permitting use of this invention will be described, followed by certain examples by way of exemplification of the present invention which is as set forth in the appended claim.

Reference is made to the accompanying drawings in which.

Figure 1:
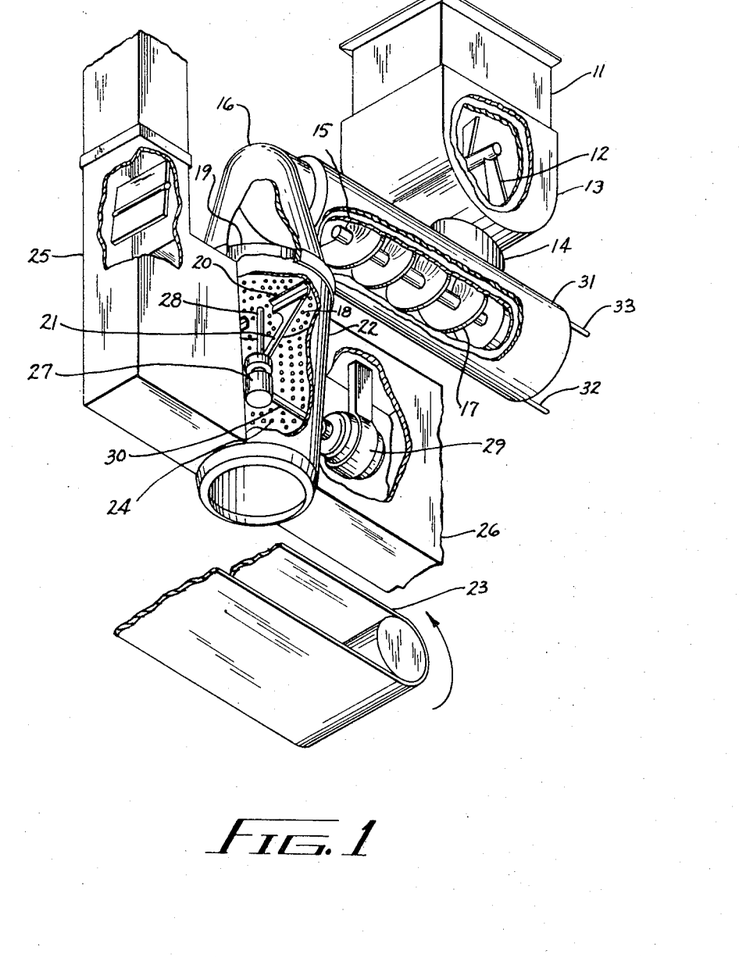
FIG. 1 is a pictorial view, with parts broken away, of a jacketed free-end extruder, with a jacketed hopper.

In the operation of our novel process, pre-weighed quantities of powdered components and granulating liquids are added continuously or incrementally to the mixing hopper 11, having the motor driven kneader 12, or feed paddles, at least a portion of the mixing hopper 11 is enclosed in a hopper temperature control jacket 13, to which steam or water is supplied for heat control. The resulting plasticized mass, which may contain one or more therapeutic materials then passes by gravity and the influence of the kneader through the feeder tube 14 to the auger sleeve 15. The plasticized mass is then moved through the auger sleeve 15 to the discharge head 16 by the rotating auger screw 17, which fits in the auger sleeve 15. The plasticized mass in the discharge head 16, being under great pressure by reason of the rotating auger screw 17, is extruded through the extrusion orifices 18 in the extrusion orifice plate 19. The extrusion orifices 18 are preferably from about 0.01-inch to about 0.05-inch in diameter, but may be as large as 0.125-inch, or even larger, and are evenly distributed in that part of the extrusion orifice plate 19 traversed by the granulation cut-off knives 20. The granulation cut-off knives 20 are mounted on knife support arms 21, so that they traverse the lower surface of the extrusion orifice plate 19, and cut the strands extruded therethrough into segments. The knives 200 are preferably two in number, and revolve at such speed in relationship to the movement of the strands of the plasticized mass being extruded that the segments, or granules, which are cut off by the knives, are from about 0.01 inch to 0.125-inch in length. The length is not necessarily the same as the diameter.

The knife support arms 21, which carry the cut-off knives 20, are actuated from and mounted on a gear box 27, which is positioned with respect to the extrusion orifice plate 19 by the positioning arm 28. The knife support arms 21 are driven by knife motor 29 by means of knife drive shaft 30 to the gear box 27.

Thus, an average granule would have a radius of 0.0125-inch, a length of 0.025-inch, a surface area of about $300 \times 10^{-5}$ square inches, a volume of $1.2 \times 10^{-5}$ cubic inches, and an area to volume ratio of approximately 250:1. Granules having these dimensions fall between 25 and 30 U.S. Standard mesh.

The granules, in the form of rods from about 0.01-inch to 0.05-inch in diameter, or more, and from about 0.01-inch to 0.05-inch in length, or more, then drop through the vertical case hardening duct 22 onto the belt conveyor 23 and are fed to a drier. The vertical case hardening duct 22 has perforations 24 arranged so as to permit the transverse passage of hot air through the vertical case hardening duct 22 from the drying air inlet 25 to the exhaust air duct 26.

As the granules drop through the vertical case hardening duct 22, the hot air passing transversely quickly dries and hardens the surface of the granules. This case hardening of the granules imparts a surface hardness which results in their having characteristic toughness and durability. This case hardening of the granules also results in the production of a minimum of fines.

The granules on the drying belt may be dried sufficiently so that they are suitable for tabletting without further treatment. If desired, after drying, the granules may be coated for sustained release preparation or mixed with a lubricant to produce a granulation having modified properties more suitable for compression into a particular tablet form, or several different granulations may be blended toegther.

As will be obvious, all materials which are to be granulated do not behave exactly the same. Similarly, various granulation sizes are desired for different purposes. For example, in making very fine or small tablets the granulation used should be comparatively small. For larger tablets, a larger granulation may be used. The size of the granulation should be such that the inclusion or omission of one single granule of the largest size does not appreciably affect the weight of a finished tablet. This is important in that in the tabletting process the granules are normally filled into cavities in a plate volumetrically and then dies axially comrpess the granules to form the finished tablet. Because they are filled volumetrically, the addition of the granules is in discrete portions, namely, not less than one granule, and if the omission or inclusion of one granule could have an appreciable effect on the therapeutic dosage in a tablet, the size of the granulation is necessarily too large. For many purposes, an accuracy of at least 1% is desired. Accordingly, the largest granule would have to have a weight of not more than 1% of the weight of the finished tablet. Where the tablets are to be made up of a blend of more than one type of granule, as for example, where a blend of therapeutic and inert materials, or a blend of two or more therapeutic material containing granules, are to be tabletted into a single tablet, the size of the granules must be somewhat smaller in order that, statistically, the proper weight will necessarily be obtained in each tablet, and the statistical distribution whereby more of one granule type may be obtained than of another is such that two or three granules of either type will not have sufficient weight to throw off the dosage of a tablet. Hence, it is usually desired that the granules be formed from strands which have a diameter of from about 0.01-inch to about 0.05-inch. Where very large tablets are to be produced, as for example, in the veterinary trade where comparatively large tablets are produced for the treatment of horses and cattle, a markedly larger granule is satisfactory. For the larger types of tablets, granulations having a diameter of up to 0.125-inch or more are satisfactory. With such large diameter granules, a somewhat longer drying time is required. Granules of comparable volume, but any chosen cross-section, are produced by selecting orifices for extrusion of appropriate shape.

Whereas, it was above mentioned that a knife could be used to cut off the individual strands in short segments, such that each segment had a length of the same order of magnitude of its diameter, other methods may be used. For example, it is frequently convenient to use no cut-off knife, and permit the strands to be extruded continuously onto a drying belt. Such an extrusion permits the individual strands to lie heterogeneously on the belt with an increased spacing because of the heterogeneous scrambled characteristic of the strands which permits more rapid drying. After the strands are dry, the strands may be broken into convenient lengths. as for example, by running through a screen mill or hammer mill. The type known as a "Fitzpatrick" presently in use in the pharmaceutical industry gives a satisfactory shattering to the strands and breaks the longer strands up into convenient size granules.

Because of the high compaction of the granules, and thorough dispersion of the binder, when the granules are run through such a shattering mill, a very small proportion of fines is obtained. The exact amount of fines depends in part upon the granulation formula used, the degree of moistness, the degree of compaction, and the screen size and operating speed of the mill. Using reasonable values of these factors, however, the quantity of fines obtained is so small that the fines may be allowed to remain with the granules during the tabletting procedure, and no reworking is required. In fact, for many purposes, a small proportion of fines is desirable to fill in interstices and give freer flowing to the tabletting operations. The length of the strands and the degree to which the strands are broken into segments has an effect on the appearance of the finished tablet. Certain modifications thereof will be described below in conjunction with special appearance tablets.

The size of the strands is controlled by the size of the orifices 18 in the orifice plate 19. Whereas it is convenient that these orifices be circular in shape, they may be ovoid, square, triangular, rectangular, star-shaped, or the like. Their effective diameter may be within the limits of 0.01-inch to about 0.05-inch for preferred tabletting procedures.

The diameter, cross-section, and length of the strand or strand segments, as well as the density or bulking, which in turn is a function of orifice cross-section, extrusion pressure and moisture content, and may be varied to expressly suit drying conditions. Rapid continuous drying is achieved, which by having a belt length and speed, and air rate suitable for the drying load, gives no fines or dust, so no dust collecting equipment is required. The strands can be extruded with internal holes, if desired.

Larger size strands may be comminuted. For example, strands having a minimum diameter of more than 0.125-inch may be broken in a sieve mill to granules small enough for small size tablets. Such flexibility in permissible operation is highly desirable. In modern pharmaceutical manufacture, it is desirable that equipment be usable on a large number of formulations, so that rapid conversion from one formulation to another can be made.

Whereas the extrusion orifices in the extrusion orifice plate 19 may be a drilled hole which is cylindrical throughout, it is usually more convenient to use a stepped configuration, or relieved hole, in accordance with conventional practice in which two or three different sized portions are used. or example, the plate may have a few comparatively large holes drilled part way therethrough, after which much smaller holes are drilled part way through the remaining portion of the plate, and then the final size hole drilled completely through. By using such a structure, the length of the smallest size, or extrusion, orifice is comparatively short, and accordingly a comparatively low friction is obtained as contrasted with the friction which would be obtained if the extrusion orifice of say a diameter of .02-inch were not relieved and extended through say a ½-inch extrusion orifice plate. Similarly, by having several small holes at the bottom of a single, much larger hole, the machine work which is required is reduced, and a stronger plate can be obtained. Such configuration of extrusion plates is known to those dealing with such plates in the extrusion of plastics or filaments, as for example, in the extrusion of synthetic monofilament yarns for the textile trades.

The heavy mixing action of the screw in the auger sleeve gives a very high shear stress and blending action or milling that more completely mixes the binder and other components, so that all solid pharmaceutical particles are coated with the binder, hence, the production of fines which do not readily compress to tablets is minimized. Additionally, the heavy mixing under compression of the granulation mix in the auger sleeve by the auger screw gives a denser granulation than would be obtained where a granulation mixture is forced through a screen in accordance with conventional practice. The effect is more like heavy mulling. This increased density permits the production of tablets with a higher final density, as well as improving the strength of the granulation, so that undue shattering is not obtained during a screening or grinding operation to reduce the size and length of the strands to a preferred granulation size. Actually, the granules can be ground so that they will pass a sieve of smaller size than the diameter of the strands as produced, but it is usually preferred that the strands be produced having a diameter less than the desired granulation size.

Fortunately and fortuitously, the degree of compaction of the granule can be, in part, varied by the treatment in the mixing hopper. If the mixing hopper is sealed and evacuated, there is a minimum of air trapped in the individual granulations; and as a result the granules are much harder and firmer than would be the case with some air trapped in them. In most instances, in the pharmaceutical trade it is desired that the mixing hopper be operated at approximately atmospheric pressure so that a certain amount of air is trapped in the granulation. The trapping of some air in the granulation gives a more rapid dissolution rate when the tablet is ingested by the user. It is to be stressed that neither characteristic is invariably desired. For some tablets, it is desired that air be trapped in the granulation, and a not too dense tablet be obtained, so that the tablet disintegrates readily and rapidly on ingestion releasing the medication in the tablet as rapidly as feasible. In other instances, it is desired that the granulation be as firm as possible, and that the tablet be compacted to as dense a structure as possible so that the tablet is dissolved at a very slow rate on ingestion which gives a delayed release tablet so that the medicament is released to the system of the user of a longer period of time. Mixed types of granules may be used so that some granules dissolve more rapidly than others, so that the tablet breaks up into fragments to increase the active area with certain of the medicaments to be released rapidly, and others to be released more slowly. The choice of the rate of release, and the relative rate of release, depends upon the particular effect desired by the administrator in a particular situation. The versatility of the present granulation system permits a wide discretionary variation which markedly contributes to the desirability of the present granulation system.

As shown in FIG. 1, the auger sleeve 15 is surrounded by an auger sleeve cooling jacket 31. A coolant supply line 32, and a coolant discharge line 33, supply and remove a coolant from its jacket. Although other fluids may be used, conveniently the coolant is water and the water jacket is operated using cool water. In many instances, cold water from a service supply line is adequate, particularly in winter. In some instances, in some areas, the water supply is too warm, and a chilled water is required.

The degree of chilling in part depends upon the granulation formula being used. With the smaller granulations which require a higher pressure for extrusions, a higher temperature differential gives better results. With larger extrusion orifices, particularly those over about 0.05-inch an adequate discharge may be obtained with little or no cooling, even though a higher and preferred discharge rate is obtained with cooling.

In operation, it is preferred that the contents of the mixing hopper 11 be at least at room temperature, or if the therapeutic ingredients permit, the mixture may be warmed up to near the boiling point of water. Heating the contents of the mixing hopper reduces the viscosity and permits a more thorough blending and less water in the granulation. As the mixture is fed down into the auger screw, the auger screw picks up, feeds, mills and compacts the mixture. Much effort has been spent in attempting to work out the theoretical aspects of auger operation; but, in general, the theoretical studies are limited to a single temperature operation, or at least one in which the temperatur change was such that the change in viscosity did not have an appreciable effect on the theoretical aspects of the calculations. In contradistinction thereto, it is here preferred that the cooling jacket be not higher than about 60° F. and preferably down around 40° F. This chills the mixture near the periphery so that the auger screw has a paste at a markedly higher viscosity than that near the center of the auger sleeve. This gives a change in viscosity, and permits the auger screw to take a bite in the mixture, and gives a great increase in throughput.

When using a typical formulation with the cooling jacket inactive, a comparatively slow extrusion rate is usually obtained, and then when cooling water is admitted to the cooling jacket the extrusion rate, or throughput will go up to from 3 to 7 times its original value. At times, the change may be such that without cooling no effective amount of granulation is extruded, and yet on cooling a high throughput is promptly obtained.

Figure 2:
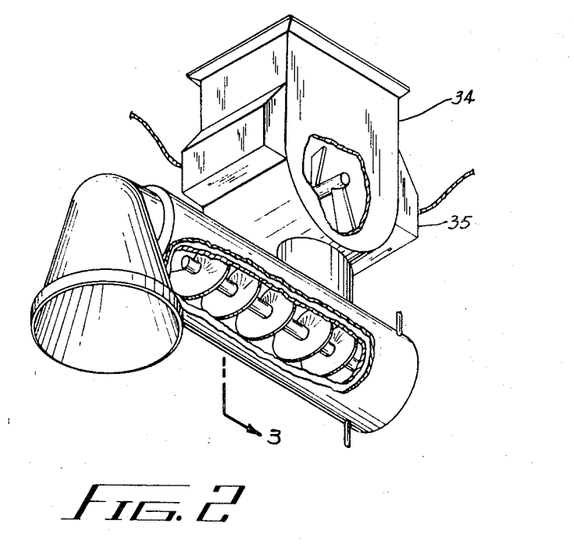
FIG. 2 is a pictorial view, with parts broken away, of an electric heated hopper extruder, with a rifled screw chamber.

In FIG. 2 is shown a similar extrusion device, except that the mixture hopper 34 is provided with electric block heaters 35 to supply heat to the mixing hopper to aid in mixing the powders and liquids during the preparations of the extrudable mass.

Also, the modification shown in FIG. 2 does not have the case hardening duct and the extrusion from the extrusion orifice plate is permitted to drop directly onto a drying belt, not shown, but otherwise the structure is as in FIG. 1.

Figure 3:
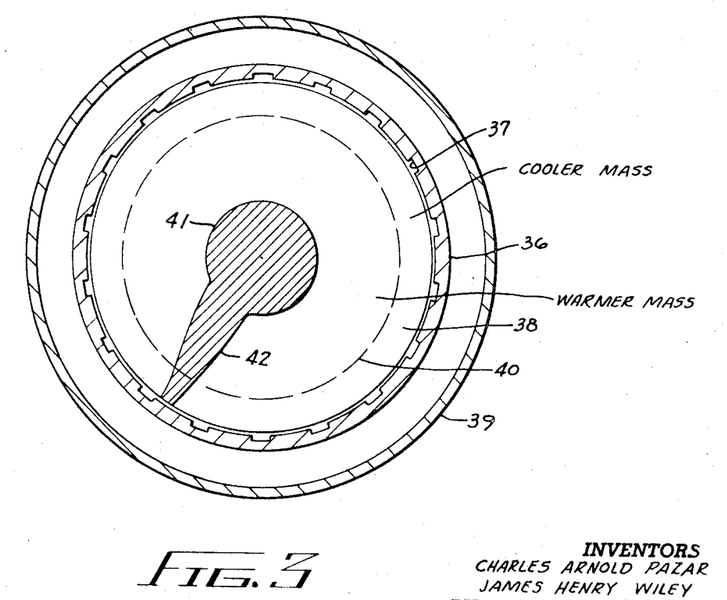
FIG. 3 is a section, enlarged, along the axis of the auger screw of the extruder of FIG. 2.

As shown in FIG. 3, the extruder of FIG. 2 has a rifle groove auger sleeve. The rifle grooved auger sleeve 36 has a series of grooves 37, like the rifling in a gun barrel which are either parallel to the sleeve axis or slightly spiraled in a direction opposed to the helix of the auger screw 38 to give an improved bite of the screw on the plastic mass and increase throughput. The rifle grooved auger sleeve also has an auger sleeve cooling jacket 39. In FIG. 3, the difference in temperature of the two zones of the outer cooler mass adjacent to the auger sleeve walls, and the warmer mass adjacent to the auger screw, is shown as separated by a dotted line representing a change in thermal zones 40.

The central shaft 41 of the auger screw 38 may have a diameter of from about ¼ to ¾ of the total diameter of the auger screw. A diameter of ¼ to ⅓ is sufficient for stiffness and permits a larger capacity for the auger screw which, by virtue of the temperature inversion has effective, rather than merely dead, volume. The screw flight 42 should be reasonably thick inasmuch as comparatively high working stresses occur with some granulations.

It is necessary that the auger sleeve and auger screw be made of a material which is corrosion resistant. Whereas experts had regarded practically any stainless steel as satisfactory, on the basis of its corrosion characteristics, and whereas experts had regarded the clearance on the radius as comparatively unimportant, it has developed that galling and self-welding occurs as well as a certain amount of burning due to the high temperature developed by friction of the screw against the sleeve which, in turn, gives localized overheating of the granulation mass.

It has now been found that by using a chrome-plated screw, friction on the screw is reduced and at the same time the tendency to galling is reduced. It is also preferred that the chamber be of a stainless material such as 316 stainless steel. With the present cooling, the clearance is not so critical so that accordingly rather than have a clearance of 0.01-inch on the radius, a clearance of as much as 0.020- to 0.025-inch on a radius of 2 inches gives a preferred result. It would at first be thought such a clearance would permit an unduly high slippage rate, but the cooling of the surface of the extrusion mass by the coolant acting through the auger sleeve permits such clearances without undue reduction in throughput. Even with such clearances, if the free end of the auger screw is unsupported, as in conventional extruder practices, the deflection in the auger screw permits the rubbing of the auger screw against the auger sleeve.

The auger screw may be supported at both ends. In the embodiment shown in FIG. 4, the auger sleeve 43 is substantially cylindrical and surrounded by an auger sleeve cooling jacket 44, to which a coolant supply line and a coolant discharge line, not shown, conducts the cooling fluid. At the rear of the auger sleeve is the auger sleeve thrust bearing 45 and the auger drive motor 46; conveniently, the auger drive motor has a slotted or polygonal adapter which positions the rear of the auger screw 47 concentrically with the auger sleeve and supports the thrust developed on the auger screw.

Figures 4, 5, 6:
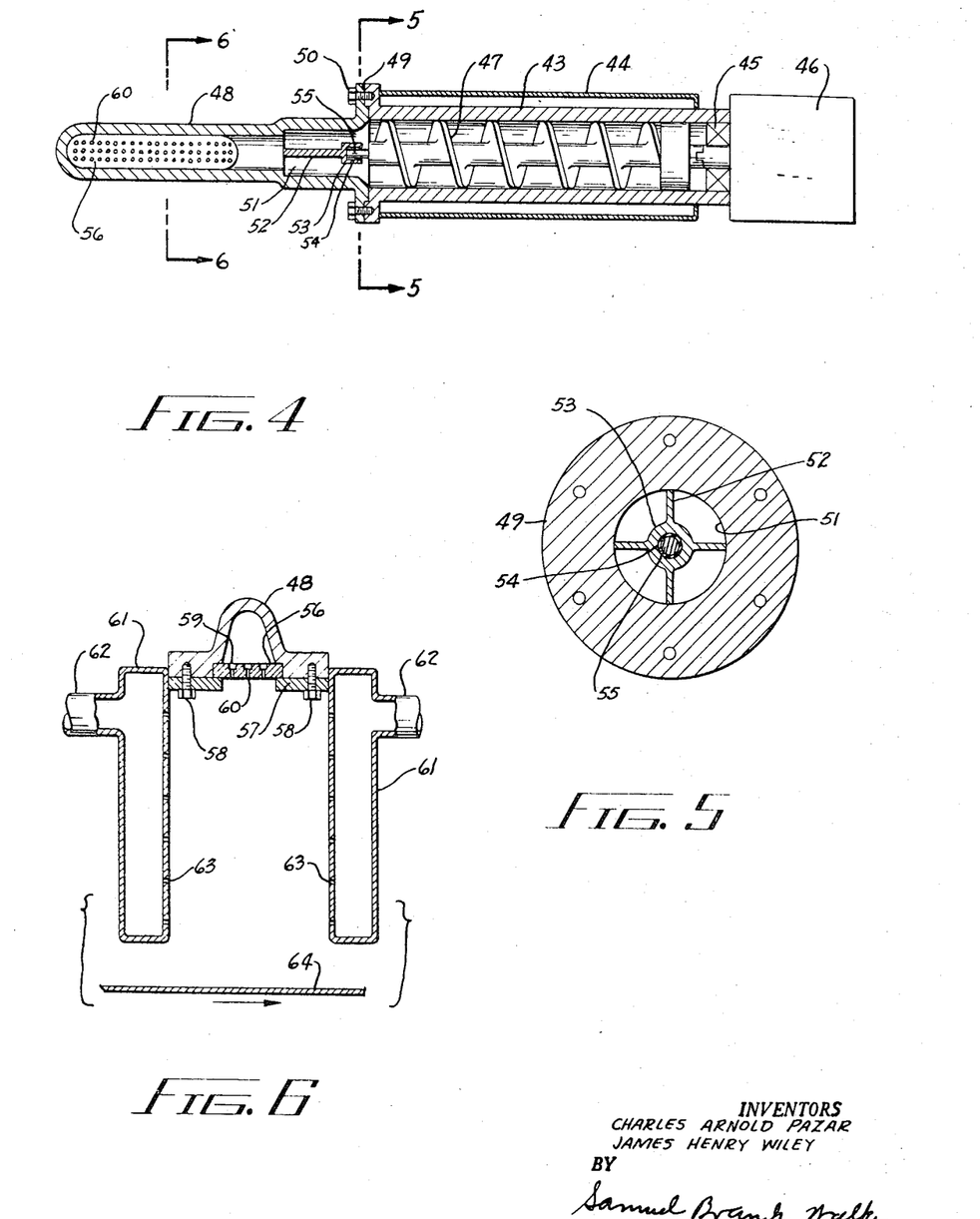
FIG. 4 is a partial section of an extruder, the end of the auger screw of which is positioned in a pilot bearing.
FIG. 5 is a section along line 5—5 of FIG. 4.
FIG. 6 is a section along line 6—6 of FIG. 4.

At the discharge end of the auger screw is the elongated discharge head 48. The elongated discharge head has a stepped flange 49 which fits against the end of the auger sleeve 43. Bolts 50 hold the elongated discharge head to the auger sleeve. It is convenient, but not necessary, that the flange have a step therein to insure that the discharge head is positioned the same concentrically with respect to the auger sleeve each time the assembly is put together. As shown in FIGS. 4 and 5, concentric with this flange is a spider bore 51 in which fits an auger screw pilot bearing spider 52. Conveniently, this spider is of X-cross section and fits into the spider bore. Adjacent to the auger screw end of the spider is the auger screw bearing 53. This conveniently is a blind bearing hole in a bushing in the auger screw pilot bearing spider and concentric therewith. A plastic bushing 54 fits in the auger screw bearing. A plastic bushing is preferred because such bushings are self-lubricating, are inert and non-toxic and non-metallic. Therefore, if any portions of this plastic bushing are released into the granulation, it would be harmless to the user, and because self-lubricating, friction is reduced and galling is minimized. Conveniently, the pilot bushing may be of nylon or polytetrafluoroethylene. A sheet of nylon can be cut on a spiral so that a spiral-stepped bearing bushing of the proper size is obtained. In this bushing is pivoted the pilot shaft 55 of the auger screw 47.

By having the auger screw supported at both ends, deflection of the auger screw is minimized and by using the clearances above mentioned of from about 20 to 25 thousandths on the radius for a 2-inch radius screw, an extrusion system is formed with virtually no chance of the auger screw rubbing on the auger sleeve with resultant galling, increased friction, burning of the granulation mass, and likelihood of metal fragments from the auger screw or auger sleeve being ripped loose and being released into the granulation.

In the modification shown in FIG. 4, the discharge head is elongated. A section through the assembly along line 6—6 is shown in FIG. 6. The elongated discharge head 48 has a corresponding shaped extrusion orifice plate 56. As shown in FIG. 6, the extrusion orifice plate 56 is held against the elongated discharge head 48 by a bracket 57 attached to the elongated discharge head by bolts 58.

The extrusion orifice plate has therein a plurality of stepped orifices 59. As above mentioned, these stepped orifices consist of a larger hole which extends part way through the orifice plate, and at the bottom of which, extending the remaining way through the orifice plate, is one or more extrusion orifices 60.

Also shown in FIG. 6 are drying air manifolds 61 to which drying air is supplied by air ducts 62. The inner surface of the drying air manifolds has a number of drying air jets 63, through which warmed drying air is discharged onto the granulation as it is extruded in strands through the extrusion orifices 60. As above mentioned, a blast of hot air at this point gives a surface hardening or case hardening to the strands which tends to prevent them from sticking to each other and renders them more readily handleable. The strands are allowed to drop upon a drying strip 64.

Figures 7, 8:
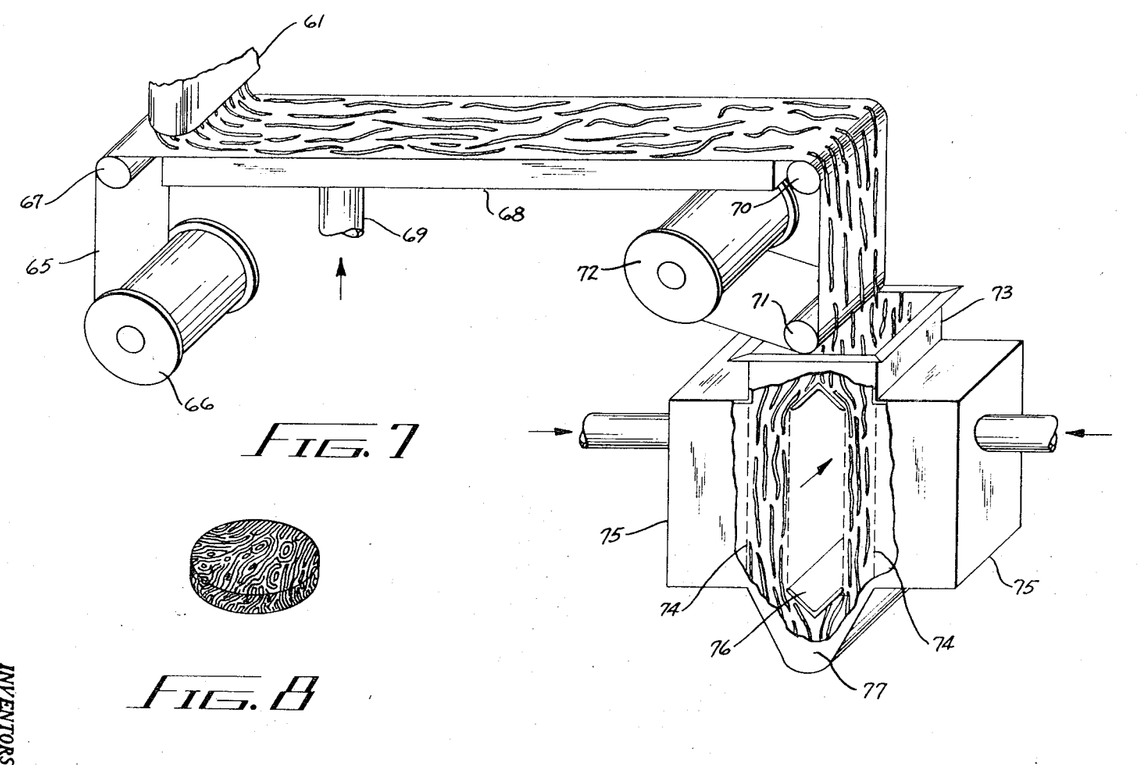
FIG. 7 is a diagrammatic view of a granulation drying system, in partial section.
FIG. 8 is a view of a completed tablet from multi-colored granules.

One convenient drying system is shown in FIG. 7. Under the drying air manifold 61, and in position to receive the strands as they are extruded from the elongated discharge head, is a porous strip 65, such as cheesecloth. This strip is wide enough to receive the entire group of extruded granules, for example, two feet, and is a long strip passing from a supply reel 66 over a pulley 67, under the extrusion head and over a drying box 68. This box conveniently is a stainless steel box about 70% of the upper surface of which is drilled out as orifices of any convenient shape, and into which box is introduced drying air through a drying air duct 69. The drying air passes up through the perforated upper side of the drying box through the strip and dries the granule strands on the surface of the strip. The strip then passes over another pulley 70, then around a discharge pulley 71, to a takeup reel 72. It is washed, if necessary, and re-used. The partially dried granules are dumped from the discharge pulley or by free fall into a drying hopper 73 which conveniently splits the granule strands and passes them downward between respective pairs of four drying screens 74. Drying air is supplied to each of two drying air boxes 75 which supply air through the outer two of the four drying screens. The air, after passing through the granule mass, passes through the inner pair of the drying screens and out through an air discharge manifold 76. The granules, after passing between the drying screens, feed into a granule conveyor 77, which is a screw conveyor which discharges the dried granules for further processing and tablet manufacture.

Obviously, other forms of drying procedures may be used, but the one shown is convenient and automatic and permits the continuous operation of the drying and extrusion steps. No manual handling of the granule strands is required. If a cut-off knife is used, the granules may be cut to a length which is desired. Otherwise, the granules may be left in endless strands which are broken up through a power-driven screening mechanism, such as a hammer mill, to sizes of granules which are convenient for the particular tabletting operation contemplated. Because of the case hardening, the granules are comparatively firm, and in fracturing release a minimum of fines.

Modifications of the screw extruder may be used. For instance, an auger screw may be used which has two screw flights, or at least a partial second flight, so at the discharge end where heavier pressures are encountered the screw is symmetrical, and less unbalance of forces is encountered which reduces side thrust. Where a double screw is used, the end of the auger sleeve itself may be lined with plastic, and the ends of the screw flights can ride on this lining as the pilot bearing.

When colloidal matter is present, the extrusion orifice plate, or the auger screw, or both, may be electrically insulated from the remainder of the extruder, and connected to a source of low voltage direct current. Electroosmosis then causes the water in the mass to migrate to the orifice plate or screw surface, and act as a lubricant to reduce friction, and at the orifice plate, to improve the surface smoothness of the extruded strands. Usually, sufficient colloidal matter is present in the binder for electroosmosis to be helpful. The sign of the charge on the colloid determines the polarity of the electrical connections. Also, the extrusion press employed may be of the piston type instead of the auger screw type, and may be either vertical or horizontal. Although revolving cutting knives are preferred for sectioning the strands into granules, other cutting means, such as cutting wires, may also be used.

The advantages of the novel process of our invention are virtually legion, and provide a significant improvement and advancement in the art of making granules for the production of tablets. The process produces a minimum of agglomerates, and fines, which need re-working. Due to an improved area-to-volume ratio, the granules produced by our novel process may be dried more quickly than in the conventional wet granulating process. This results in a substantial decrease in manufacturing time. The granules obtained by the process of our invention show freedom from dust, are uniform in size, shape, density and color, exhibit free-flowing, non-bridging characteristics, are extremely tough and durable, and do not vary appreciably from batch to batch. This facilitates the production of substantially correct size granules without re-working. If the size of the granules as extruded and cut off is appropriately selected, comminuting is not necessary.

Because of the free-flowing character, and the uniform density, volumetric loading in a tabletting machine is simplified, and tablets of comparatively uniform size, density, and weight, strength and color, are readily produced. For pharmaceutical purposes, uniformity in size, density and weight, is highly desirable.

Unexpectedly, it has been found that granules made by the novel process of our invention require less lubricant for compression. In addition to a saving in material, this feature reduces dusting during compression and improves the uniformity of the color of the finished tablet. The tablets formed from granules obtained by the novel process of our invention quite unexpectedly show superior hardness, density and disintegration properties. Capping and chipping during compression into tablet form are substantially reduced which, in turn, reduces losses due to re-working and package return. Furthermore, the surface roughness of the tablets may be readily controlled, which is an aid in making coated tablets. The number of pieces of equipment used and the man-hours necessary to handle a given amount of material are enormously reduced by the practice of the present invention. This, combined with the savings in material obtained by the elimination of losses due to dusting, sticking, etc., results in a substantial reduction in manufacturing costs.

The versatility and efficiency of the novel process of our invention results in additional savings of time and material which are not obvious at first glance. Transfer and dust losses of material (which material may be of very high value) attributable both to the dry granulating and wet granulating processes in current use, are completely eliminated. Moreover, the plasticized mass, which ordinarily causes material holdup by sticking to apparatus parts and then loss due to cleaning apparatus parts is confined to a single, self-cleaning auger sleeve. Accordingly, material loss is considerably less in the novel process of the present invention than in other granulating methods.

The standard pharmaceutical formulations currently used in the conventional wet granulating process may also be used in the novel process of this invention. Thus, an unexpected added advantage of the present invention lies in the fact that sweeping formulation changes, which would require extensive additional clinical investigation before being released for sale, are not necessary.

The novel process of the present invention forms the basis for a means of combining chemically incompatible materials. Test tablets exhibit between-granule but not through-granule cleavage, thus indicating that the granules are not unduly crushed or altered when compressed into tablets. As the reaction of chemically incompatible materials with one another in a tablet must be at contacting surfaces, it follows that such reactions are minimized by the use of discrete granules which do not break up appreciably during compression into tablet form but remain particulate and separate. This characteristic of the granules produced by the novel process of the present invention also forms the basis for a means of preparing mosaic tablets. For example, a number of granulations, each having a different color due to innocuous, compatible dyes, are prepared by our process and then simply mixed. By compression of this mixture, tablets are obtained having a mottled or mosaic appearance which is pleasing to the eye and most attractive to children.

In another application, utilizing the characteristic toughness of the granules, a distinctive tablet is made, the surface of which is sharply inlaid with colored lines resembling a very small scale jigsaw puzzle. This tablet is made by dusting granules made by the process of this invention with an innocuous dye, before compression. By polishing of the outer surfaces, the resulting network of lines outlines each granule on the surface of the finished tablet. The exposing of grains, as described, is somewhat analogous to the differential etching used in metallography to reveal crystal type and grain orientation. It should be noted that, in contradistinction to the effect of "fines" discussed previously, dusting with dye does not inhibit compression. Tablets having the jigsaw design are difficult to counterfeit and provide unmistakable tablet identification which would tend to reduce or prevent errors in dispensing and administering such tablets.

In some instances, it is desirable that medicaments be released in a desired order at a desired rate. By using the granules of the present invention, the individual granules may be coated with a delaying coating, such as ethyl cellulose, or methyl cellulose, poly(vinylpyrrolidone), starch, shellac, or other release delaying material, and the granules incorporated into the final tablets, or filled into capsules. By a suitable choice of thickness of layer, and a suitable choice of the relative number of the granules to be coated, any desired release program may be achieved. Also, excellent sustained release qualities are obtained by the use of suitable binders in the granulation formula. The above coating materials, or glue, or gelatin, or a combination, are selected to give the desired release rate. The tablets remain intact on ingestion, and because of high tablet to tablet uniformity, the release rate is consistent. Similarly, because the materials being compressed are dry, effervescents such as for example a mixture of dry citric acid and dry sodium bicarbonate may be included in the tablet, and the tablet processed and kept dry. As soon as the final tablet is ingested, the moisture of the mouth and stomach causes the rapid interaction of the citric acid and sodium bicarbonate with the release of carbon dioxide which causes the rapid disintegration of the tablets. By the inclusion of an effervescent, the rapidity of the action of the therapeutic agents in the tablet may be increased. Thus, it is possible for tablets to be produced which have either an accelerated or a delayed release, or in part by suitable granulations being mixed, some components may be released on an accelerated schedule, and others on a delayed schedule.

For delayed released materials, if a mottled tablet is used where certain of the granules, either in short segments or in longer cylindrical strands, are compressed together, simple inspection will show the relative proportions of each, and permit the operator, by inspection to be certain that proper blending and mixing of the granules forming the tablets is being achieved. Not only is a mottled configuration, including various colors, in the granulations interesting from the standpoint of a customer in having sales appeal, but the positive identification achieved is highly desirable as it prevents imitation, passing off or forgery. Even if the tablets are to be coated with a sugar-coating, it is convenient that the contents have a mottled configuration in order that either the purchaser or the dispenser may, by cracking open the tablets, achieve positive identification.

As an example, a dicalcium phosphate white blank from a powder having a size of not less than 99.5% through a 200 U.S. Standard mesh sieve was mixed with water, to form a crumb and placed in the hopper of the machine shown in FIG. 4. When the agitated mixture was heated to 33° C., and extruded at the same temperature, a throughput of approximately 72 kilograms per hour was obtained. When the hopper was heated to about 60° C. and the jacketed cooled to between 18° and 22° C., the extrusion rate was increased to 198 kilograms per hour. When the jacket temperature was decreased to 10° C., the extrusion rate was increased to 288 kilograms per hour, which approaches the free discharge rate of the screw. Hence, further improvements are theoretically impossible without modifying the auger screw.

The following table is typical of the tablets produced from the present screw-extruded compacted granulation and from a conventional wet granulation.

TABLE I

| | Convential granulation | Screw-extruded Compacted granulation |
|---|---|---|
| Tablet weight (average of 20), gm. | 1.4849 | 1.4917 |
| Standard deviation, gm | 0.0175 (1.18%) | 0.0071 (0.48%) |
| Tablet thickness (average of 20), in. | 0.214 | 0.213 |
| Standard deviation, in | 0.00134 (0.63%) | 0.00074 (0.35%) |
| Tablet hardness (average of 20) (crushing stength), kg., Strong-Cobb | 11.5 | 17 |
| Standard deviation, kg | 1.28 (11.13%) | 1.55 (9.12%) |
| Tablet friability (run on 10): | | |
| Percent loss in weight after 100 falls | 0.97 | 0.74 |
| Percent loss in weight after 200 falls | 2.25 | 1.61 |

In another example, a tablet blank was prepared using a sucrose mix and an extension plate having 988 0.045-inch diameter holes. Finely ground sucrose was mixed with water until it had a typical crumb used in screen granulations, and then extruded onto a cheesecloth strip. The cheesecloth strip was kept moving at a speed of about 2½ feet per minute, and the extruded strand at about the consistency of toothpaste as it came out of the extrusion orifices. The mixture was kept at about 60° C., and the cooling jacket at about 10° C. Two hundred cubic feet per minute of air at 68° C. was blown through the case hardening duct, which gave a surface hardening to the strands. The strands were dropped onto the moving belt, and 1,000 cubic feet per minute of air, at 68° C., was blown through the cheesecloth. The moisture was cut from 7% to 3%, at which point the product was snappable and could be readily handled. The strands were then dropped into the double-wall dryer of FIG. 7 where air at 120° C. was passed through for 2 hours, which cut the moisture content to nearly zero.

It was estimated that the extrusion pressure varied between 600 and 2,000 lbs. per square inch at the face of the extrusion plate.

The extrusion blank after the drying step, was passed through a Fitzpatrick screen, and broken to size such that about 15% would pass a 12-mesh screen and be retained on a 16, 70% would pass a 16-mesh screen and be retained on a 40, 13.3% would pass a 40-mesh screen and be retained on a 200, and about 1.7% would pass a 200-mesh screen. The blank granulation was mixed with an enzyme and then compacted to form tablets. Tablets were readily formed which had a hardness of 25 kilograms, as tested on a Strong-Cobb hardness tester, the limit of the hardness test.

Usually it is desirable for small size pharmaceutical tablets to have from 0% to 20% pass a 12-mesh screen and be retained on a 16-mesh, and from 60 to 100 pass a 16, and be retained on a 40, and from 0% to 20% pass a 40, and be retained on a 200, and not more than 3% pass a 200-mesh screen (U.S. Standard Series). These size distributions are given by way of illustration, and not by way of limitation, as although preferred, a wide variation of granulation size may be used and, in part, varies with the size of the tablet being produced. Under any conditions, the maximum size of the granules should be such that one granule, more or less, of any component in the tablet does not appreciably change the therapeutic effect of a single tablet.

In the conventional wet granulating process, the constituents, in addition to the active therapeutic components, are: an excipient or filler such as lactose or sucrose; a lubricant such as magnesium stearate, calcium stearate, stearic acid, etc.; and a binder such as tragacanth, acacia, or a polyethylene glycol. These, as well as a wide variety of other substances well known to those skilled in the art of preparing tablet granulations may be advantageously employed in the process of this invention.

Inasmuch as the novel process of this invention may be readily controlled within very narrow limits of temperature, it is particularly suitable for the preparation of tablets containing pharmaceutical components which are sensitive to heat. Thus, it is possible to prepare, in accordance with out process, not only conventional tablets such as those containing sulfonamides, digitalis, propylthiouracil and similar therapeutics but also tablets containing such labile pharmaceutical ingredients as vitamins, for example, vitamins A, B, and D; alkaloids such as reserpine, morphine, hyoscyamine, and atropine; hormones such as cortisone; and antibiotics such as 6-demethyltetracycline, 7 - chlorotetracycline, tetracycline, penicillin and streptomycin.

It is to be understood that the process of this invention is broadly adaptable to the preparation of a wide variety of tablet granulations in the pharmaceutical field, and it is intended that the broad, as well as the specific, features and modifications of our novel process be included within the scope of our invention, as set forth in the appended claim.

What is claimed is:

1. A therapeutic jigsaw design tablet visibly formed from a plurality of separate granules, of visibly different colors at least some of the said granules containing therapeutic material which granules are compressed into a single tablet, but which show the separate discrete extruded cylindrical rod-shaped granules which are compressively bound together in a jigsaw design and which granules retain their identity, even though distorted and compressed in being bound together, the size of each granule being such that no granule contains more than 1% of the total tablet does of any therapeutic material, and the standard deviation from average of the weight of said tablet is not greater than about 0.48%, based on a sample of 20 tablets, said plurality of visibly different colors in accordance with a predetermined code, serving as identification characteristic of the therapeutic material, said jigsaw design tablets being difficult to counterfeit and providing unmistakable tablet identification which tends to reduce or prevent errors in dispensing as well as aiding in detection of counterfeiting or substitution.

References Cited

UNITED STATES PATENTS 3,044,938  7/1962  Halley _______________ 424—33

ROBERT F. WHITE, Primary Examiner

J. R. THURLOW, Assistant Examiner

U.S. Cl. X.R.

40—2.2, 300; 264—148, 245; 424—6, 19, 44